3,236,591
METHOD OF WORKING UP CRUDE SODIUM CARBONATE
Bertil Sixten Groth, Stockholm, Sweden
No Drawing. Filed Sept. 21, 1964, Ser. No. 398,045
11 Claims. (Cl. 23—63)

This application is a continuation-in-part of my application Serial Number 109,818 filed May 15, 1961, and now abandoned.

This invention relates to a method of working up crude sodium carbonate obtained by combustion of waste sulfite liquor.

The most usual method of recovering chemicals in waste liquors resulting from decomposition of wood and other vegetable material by means of acid, neutral or alkaline solutions of sodium sulfite is to evaporate and burn the liquors, and to work up the resultant powder-like loose ash, generally called crude recovered sodium carbonate or soda smelt, to obtain sodium sulfite digesting liquor of desired composition. The crude sodium carbonate consists mainly of neutral sodium carbonate and sodium sulfide, but contains further minor quantities of sodium sulfate, sodium sulfite, hydrosulfite, sodium polysulfides and components insoluble in water, i.e. carbon particles. The working up process generally comprises essentially the following steps:

(1) Dissolving the crude sodium carbonate in water and removing undesired constituents from the solution by precipitation, filtration, etc.;

(2) Treating the resultant solution with carbon dioxide carbonation to convert the carbonate and the sulfide into hydrocarbonate and expelling the hydrogen sulfide set free;

(3) Combustion of the hydrogen sulfide to form sulfur dioxide;

(4) Causing reaction of the hydrocarbonate solution or suspension with sulfur dioxide to obtain sulfite solution of desired composition.

The step of carbonation, step 2 above, presents many difficulties. In the processes used hitherto, the carbonate treatment starts with an aqueous solution of the crude sodium carbonate. In certain of these prior processes, the carbonation treatment is carried out under such conditions of concentration of crude sodium carbonate and temperature of treatment as to cause part of the resulting sodium hydrocarbonate to crystallize; whereas in others of such prior processes the concentration of crude sodium carbonate at the start is so low and the reaction temperature used throught the carbonation step is so high as to cause the sodium hydrocarbonate to remain dissolved. Sodium hydrocarbonate possesses a strong tendency to settle on the surfaces of the reaction vessels within which the carbonation is effected. For this reason, two reaction vessels have been used in parallel, one of these always being kept out of operation for the purpose of dissolving and the incrusted sodium hydrocarbonate.

When working with either relatively concentrated or highly diluted solutions of the crude sodium carbonate, but particularly in the latter case, and under high temperatures, it is necessary to use carbon dioxide in considerable excess for obtaining sufficient desulfurization. The reasons are, partly, that carbon dioxide as acid is only insignificantly stronger than hydrogen sulfide (the primary electrolytic dissociation contains at 20° C. being $4.2\times10^{-7}$ and $9.1\times10^{-6}$, respectively) and, partly, that carbon dioxide is considerably less soluble in water than is hydrogen sulfide. At 20° C. 100 grams of water dissolve 0.162 gram of carbon dioxide but dissolve 0.385 gram of hydro sulfide; at 50° C. 100 grams of water dissolve 0.076 gram and 0.188 gram of carbon dioxide and hydrosulfide respectively. It is, therefore, quite natural that the decomposition of the sodium hydrosulfide formed according to the equation

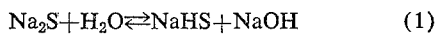
$$Na_2S+H_2O\rightleftarrows NaHS+NaOH \qquad (1)$$

and which said decomposition takes place according to the equation

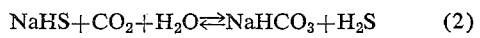
$$NaHS+CO_2+H_2O\rightleftarrows NaHCO_3+H_2S \qquad (2)$$

and the expelling of the liberated hydrogen sulfide from the reaction solution causes difficulties.

It is the main object of the present invention to overcome the aforementioned difficulties which occur in the carbonation of a solution of crude sodium carbonate.

According to one main feature of the invention the carbonation is performed under such conditions that the salt constituents are present predonderantly in solid state. The reaction may then be directed either to obtain:

(A) Hydrocarbonate according to the reaction steps represented by the following equations:

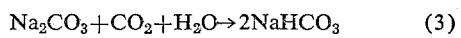
$$Na_2CO_3+CO_2+H_2O\rightarrow 2NaHCO_3 \qquad (3)$$
$$Na_2+CO_2+H_2O\rightarrow NaHCO_3+NaHS \qquad (4)$$
$$NaHS+CO_2+H_2O\rightarrow NaHCO_3+H_2S \qquad (5)$$
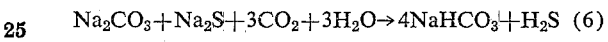
$$Na_2CO_3+Na_2S+3CO_2+3H_2O\rightarrow 4NaHCO_3+H_2S \qquad (6)$$

or to obtain:

(B) Sodium carbonate, by converting only the sulfide by a reaction according to the equation

$$Na_2S+CO_2+H_2O\rightarrow Na_2CO_3+H_2S \qquad (7)$$

In this instance the crude sodium carbonate is assumed to consist of equimolar quantities of sodium carbonate and sodium sulfide.

According to both alternatives A and B, in addition to carbon dioxide, water is also bound in the carbonation.

In the reaction according to alternative A the temperature must be so low that the hydrocarbonate is not dissociated to any considerable extend. This means that it must not exceed 50 to 60° C. In the reaction according to alternative B, however, the temperature must be so high that the hydrocarbonate is dissociated entirely, which implies that it must be at least 90 to 100° C. The reaction may obviously be performed also at temperatures intermediate the foregoing ranges, in which case the reaction product will contain both hydrocarbonate and sodium carbonate.

By working with the salt constituents in preponderantly solid condition in accordance with the invention the carbonation and the expulsion of the hydrogen sulfide are effected quickly and completely. This seems to be attributable to the following features. The constituents of the crude sodium carbonate, and in particular the sodium sulfide, vigorously take up water while the hydrogen sulfide or sodium hydrosulfide are formed. Sodium hydrosulfide and sodium hydroxide which are formed by hydrolysis of sodium sulfide according to the Equation 1 are even deliquescent and thus form a moist layer of mother liquor on the surface of the crystals. Due to the high salt concentration, the carbonate when being formed will gradually crystallize out during the carbonation. This contributes greatly to a displacing to the left of the equilibrium of Equation 2. The relative acidic strength and water solubility of the carbon dioxide and the hydro sulfide thus becomes much less significant than when operating in highly diluted solutions. Instead thereof, the course of the reaction will be dominated by the absolute and relative solubility of the sodium hydrocarbonate and the sodium carbonate, respectively, in relation to the solubility of the sulfide components.

If the crude sodium carbonate or soda melt should contain a high percentage of sulfide, then the mixture during the carbonating step shows a tendency to agglomerate to such an extent as to create technical difficulties which hinder the carrying out of the process. The agglomeration is undoubtedly due to the fact that the chemical reactions taking place during the carbonation require water, resulting in the formation of hydrates as intermediate products.

I have discovered that the agglomeration of the salts in the reaction mixture during the carbonation step can be prevented so that its loose, powder-like characteristics will be maintained, and that such agglomeration may be prevented by recirculating a certain proportion of the carbonated soda melt and thus mixing the powder-like soda smelt or crude sodium carbonate which is yet to be carbonated and desulfurized, with soda smelt which has already been carbonated. This recirculation is particularly effective when carbonation to sodium bicarbonate takes place at low temperature.

It is, therefore, another object of the invention to provide a method of carbonating and desulfurizing crude sodium carbonate which will produce a loose, powder-like substance.

The composition of the hydrate of the said components and the solubility of the salts is of great importance in determining the conditions under which the reaction solution will be in preponderantly solid state. Sodium sulfide crystallizes below 48.9° C. with 9 molecules of water of crystallization, and between 48.9° C. and 95° C. with 5.5 molecules of water of crystallization. This latter hydrate is progressively decomposed as the temperature rises further, but the anhydrous state is not attained except at a rather high temperature. Sodium hydrosulfide is, as already stated, strongly deliquescent. Sodium carbonate crystallizes up to 32° C. with 10 molecules of water of crystallization and between 32° and 107° C. with 1 molecule of water of crystallization and is anhydrous above 107° C. Sodium hydrocarbonate does not form any hydrate. It is, moreover, much less soluble in water than the three other salts mentioned.

A crude sodium carbonate consisting of equimolar quantities of sodium sulfide and sodium carbonate at 32° C. is thus capable of binding 1.89 parts by weight of water of hydration while maintaining its solid state. Between 32° and 49° C., 1.12 parts by weight of water of hydration are bound; between 49° and 95° C., 0.72 part by weight of water are bound; and between 95° and 107° C., gradually reduced quantities of water are bound. At 107° C., a sudden reduction will occur, because the sodium carbonate at said temperature loses its last molecule of water of crystallization.

In the conversion of crude sodium carbonate with carbon dioxide to obtain sodium hydrocarbonate according to Equation 6, 0.15 part by weight of water are consumed per one part of crude sodium carbonate. In the reaction to obtain sodium carbonate according to the Equation 7, 0.10 part by weight of water are consumed per one part of the crude sodium carbonate.

In the carbonation of the hydrated crude sodium carbonate in a conversion directed to obtain sodium hydrocarbonate, which means at temperatures below 50 to 60° C., all water of hydration will be liberated gradually excepting, however, for the water consumed in the reaction according to Equation 6. At higher temperatures up to 107° C., the sodium carbonate present from the start, in addition to that formed during the carbonation, will bind 1 molecule of water of crystallization. Above 107° C., a reaction product free from water of crystallization is obtained.

The explanations given hereinbefore imply that in general it will not be possible to carry out the carbonation with the salt constituents in an entirely solid state, but that a smaller quantity of free water in the form of mother liquor will always be present in some stage of the carbonation. For the run of the reaction, this feature is desirable; the quantity of free water, however, is not allowed to become so high as to counteract the crystallization of the carbonate when formed. In particular in a continuous carbonation process carried out countercurrently, it is desirable for the rate of supply and charge that the salt components present in the reaction mixture are for their major part, i.e. more than 50 percent, in a solid or water-free or hydrated condition.

Calculations have shown that the following approximate quantities of water may suitably be added during the carbonation without danger of the salt mixture becoming too wet, viz.

Parts by weight of water per 1 part by weight of crude sodium carbonate at—

| | |
|---|---|
| 30° C. | 2.5 |
| 40° C. | 1.7 |
| 60° C. | 1.2 |
| 100° C. | 1.1 |

Particularly suitable working conditions are obtained within the temperature range from 40° to 70° C., with a quantity between 1.7 and 0.8 part by weight of water per 1 part by weight of crude sodium carbonate. In the temperature range from 70 to 120° C., the process is carried out preferably in the presence of between 1.2 and 0.3 part by weight of water per 1 part by weight of crude sodium carbonate.

If the carbonation step is effected in a perfect countercurrent with pure carbon dioxide, pure hydrogen sulfide and sodium hydrocarbonate and/or sodium carbonate can be obtained as final products. If diluted carbon dioxide, such as flue gases, for example, are used, the hydrogen sulfide obtained is necessarily mixed with nitrogen contained in the flue gases. Nevertheless, in this case, carbon dioxide need also not be used in considerable excess.

The carbonation and the desulfurization according to the invention may be combined with a combustion of the expelled hydrogen sulfide into sulfur dioxide and utilization of the sulfur dioxide to convert the recovered hydrocarbonate or carbonate to sulfite and/or hydrosulfite, which in turn may constitute one step in the working up of the waste liquor.

The following examples are intended to illustrate the invention.

*Example 1.*—100 grams of ground, water-free, crude recovered sodium carbonate having a sulfide content of approximately 50 molar percent were intimately mixed with 80 grams of water. A layer of said hydrated crude sodium carbonate was formed in a tube having a diameter of 20 millimeters, to a thickness of 50 centimeters, the tube being kept at a temperature of 50° C. by means of heating the wall thereof. Carbon dioxide was introduced into the base part of the tube at a rate of 2 liters per minute. The carbon dioxde was absorbed completely and soon pure hydro sulfide commenced to escape from the top portion of the tube. Not before more than half of the sulfide contained in the crude sodium carbonate had been carbonated, did the hydro sulfide commence to contain carbon dioxide. In the base portion of the tube, the desulfurization was ascertained to be complete.

*Example 2.*—The same experiment as described in Example 1 was carried out, but the temperature was maintained at 100° C. In this case, carbon dioxide commenced to pass through the layer of reaction substance after one third of the sulfide contained in the crude sodium carbonate had been carbonated. The desulfurization in the base portion of the tube was almost complete.

*Example 3.*—The same experiment was made as described in Example 1, but carbon dioxide diluted with 80 percent by volume of nitrogen was used. After slightly more than one-third of the sulfide contained in the crude sodium carbonate had been carbonated, carbon dioxide commenced to appear in the escaping gas of reaction.

The salt mass in the base portion of the tube was found to be almost free from sulfide.

While several more or less specific embodiments of the invention have been described in the preceding examples, it is to be understood that they are quoted for purpose of illustration only, and that the invention is not to be limited thereby, but its scope is to be determined by the appended claims.

What I claim is:

1. The method of carbonating and desulfurizing crude sodium carbonate obtained by evaporation and combustion of waste sulfide liquors and containing principally sodium carbonate and sodium sulfide in powder-like form while maintaining the power-like characteristics, of said salts which comprises introducing carbon dioxide into the crude sodium carbonate while adding water thereto in an amount sufficient to maintain the chemical reaction, maintaining the reaction mixture at a temperature in relation to the amount of added water so as to cause the salt components in the reaction mixture to be present therein preponderantly in a solid state, mixing a sufficient amount of the thus carbonated substance with the crude sodium carbonate to prevent agglomeration of the components during said carbonation, and simultaneously expelling from the reaction mixture the hydrogen sulfide formed in the reaction.

2. A method as claimed in claim 1 wherein the reaction is performed within a temperature range between 40° and 70° C. in the presence of between 1.7 and 0.8 part by weight of water per 1 part by weight of crude sodium carbonate.

3. A method as claimed in claim 1 wherein the reaction is performed within a temperature range between 70° and 120° C. in the presence of between 1.2 and 0.3 part by weight of water per 1 part by weight of crude sodium carbonate.

4. A method as claimed in claim 1, wherein the carbonation is effected by flowing the carbon dioxide countercurrently to the flow of said crude sodium carbonate.

5. The method of carbonating and desulfurizing smelt sodium carbonate obtained by evaporation and combustion of waste sulfide liquors and containing principally sodium carbonate and sodium sulfide by adding water to said smelt sodium carbonate and introducing carbon dioxide into the thus water-admixed material, characterized by effecting the reaction at a temperature within the range between 40 and 120° C. in the presence of less than 1.7 parts by weight of added water per 1 part by weight of smelt sodium carbonate to cause the salt components in the reaction mixture to be present therein to more than 50 percent in a solid, partly hydrated state, and expelling from the reaction mixture the hydrogen sulfide formed in the reaction.

6. The method set forth in claim 1, wherein the temperature of the reaction mixture is maintained sufficiently low so as to avoid any substantial dissociation of formed sodium hydrocarbonate.

7. The method set forth in claim 1, wherein the temperature of the reaction mixture is maintained sufficiently high to effect substantially complete dissociation of sodium hydrocarbonate.

8. The mixture set forth in claim 1, wherein the temperature of the reaction mixture is maintained in a range to yield both sodium hydrocarbonate and sodium carbonate.

9. A method as defined in claim 1, wherein the hydrogen sulfide expelled from the reaction mixture is burned to form sulfur dioxide, and said sulfur dioxide is utilized to convert the formed carbonate into a salt selected from the group consisting of sulfite and hydrosulfite and a mixture of sulfite and hydrosulfite.

10. A method as defined in claim 5, wherein the reaction is performed within a temperature range between 40° and 70° C., in the presence of between 1.7 and 0.8 part by weight of water per one part by weight of crude sodium carbonate.

11. A method as defined in claim 5, wherein the reaction is performed within a temperature range between 70° and 120° C., in the presence of between 1.2 and 0.3 part by weight of water per one part by weight of crude sodium carbonate.

References Cited by the Examiner

UNITED STATES PATENTS

| | | | |
|---|---|---|---|
| 116,664 | 7/1871 | Balmain | 23—64 |
| 2,675,297 | 4/1954 | Gray et al. | 23—63 |
| 2,841,561 | 7/1958 | Gray et al. | 23—63 X |
| 2,864,669 | 12/1958 | Ahlborg et al. | 23—64 |

MAURICE A. BRINDISI, *Primary Examiner.*